(12) United States Patent
Koike (10) Patent No.: US 7,038,346 B2
(45) Date of Patent: May 2, 2006

(54) STATOR WINDING WITH COATED INSULATION FILM ARRANGEMENT FOR A ROTARY ELECTRIC MACHINE

(75) Inventor: Akihito Koike, Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/994,446

(22) Filed: Nov. 23, 2004

(65) Prior Publication Data

US 2005/0073209 A1    Apr. 7, 2005

Related U.S. Application Data

(63) Continuation of application No. 09/985,414, filed on Nov. 2, 2001, now Pat. No. 6,894,415.

(30) Foreign Application Priority Data

Nov. 6, 2000   (JP)   ............................. 2000-337847

(51) Int. Cl.
*H02K 19/26* (2006.01)
(52) U.S. Cl. ...................... 310/184; 310/201; 310/208
(58) Field of Classification Search ................ 310/208, 310/215, 184, 201, 180, 45, 179, 195, 42, 310/254
See application file for complete search history.

(56) References Cited

U.S. PATENT DOCUMENTS

| 565,647 | A | 8/1896 | Thomson et al. |
|---|---|---|---|
| 693,578 | A | 2/1902 | Wait |
| 1,822,261 | A | 9/1931 | Apple |
| 1,826,295 | A | 10/1931 | Apple |
| 3,079,519 | A | 2/1963 | Kitson, Jr. et al. |
| 3,749,950 | A | 7/1973 | Lenz |
| 4,001,616 | A | 1/1977 | Lonseth et al. |
| 4,307,313 | A | 12/1981 | Rohrer |
| 4,309,636 | A | 1/1982 | Pollok |
| 4,399,843 | A | 8/1983 | Sedgewick |
| 4,533,580 | A | 8/1985 | Otty |
| 5,097,167 | A | 3/1992 | Kanayama et al. |
| 5,619,787 | A | 4/1997 | Couture et al. |
| 5,729,068 | A | 3/1998 | Gasparini et al. |
| 5,864,193 | A | 1/1999 | Katoh |
| 5,926,940 | A | 7/1999 | Toh et al. |

(Continued)

FOREIGN PATENT DOCUMENTS

EP    1 041 696 A1    10/2000

*Primary Examiner*—Thanh Lam
(74) *Attorney, Agent, or Firm*—Oliff & Berridge, PLC (57) ABSTRACT

A vehicle rotary electric machine includes a rotor, a stator having a stator core and a stator winding mounted in the stator core and a pair of frames for supporting the rotor and the stator. The stator winding has a plurality of conductor segments coated with insulation film. Each of the conductor segments has segment ends that are circumferentially aligned and form tow or more rings. The segment ends that contact each other are welded and form joints of winding that have a bare surface. Therefore, electrolyte or foreign particles are prevented from staying at otherwise deteriorated insulation film.

10 Claims, 7 Drawing Sheets

U.S. PATENT DOCUMENTS

| | | |
|---|---|---|
| 5,955,810 A | 9/1999 | Umeda et al. |
| 5,998,903 A | 12/1999 | Umeda et al. |
| 6,124,660 A | 9/2000 | Umeda et al. |
| 6,229,241 B1 | 5/2001 | Ishigami et al. |
| 6,285,105 B1 | 9/2001 | Asao et al. |
| 6,291,918 B1 | 9/2001 | Umeda et al. |
| 6,333,573 B1 | 12/2001 | Nakamura |
| 6,337,529 B1 | 1/2002 | Higashino et al. |
| 6,459,177 B1 * | 10/2002 | Nakamura et al. ............ 310/42 |
| 6,459,186 B1 | 10/2002 | Umeda et al. |
| 6,492,757 B1 | 12/2002 | Nakamura et al. |
| 6,501,206 B1 * | 12/2002 | Oohashi et al. ............. 310/184 |
| 6,507,137 B1 | 1/2003 | Asao et al. |
| 6,552,463 B1 | 4/2003 | Oohashi et al. |
| 6,624,544 B1 | 9/2003 | Higashino et al. |
| 2001/0020807 A1 | 9/2001 | Imori et al. |

* cited by examiner

STATOR WINDING WITH COATED INSULATION FILM ARRANGEMENT FOR A ROTARY ELECTRIC MACHINE

CROSS-REFERENCE TO RELATED APPLICATION

The present application is based on and claims priority from Japanese Patent Application 2000-337847, filed Nov. 6, 2000, the contents of which are incorporated herein by reference. Further, the present application is a continuation of U.S. application Ser. No. 09/985,414, filed Nov. 2, 2001 now U.S. Pat. No. 6,894,415, which is incorporated herein by reference in its entirety.

BACKGROUND OF THE INVENTION

1. Field of Invention

The present invention relates to a vehicle rotary electric machine for a passenger car, a truck, etc.

2. Description of Related Art

Recently, in order to solve environmental problems, various efforts to reduce idling rotation speed of a vehicle and vehicle weight for improving fuel consumption, and to narrow the engine compartment for increasing the passenger compartment have been made. As a result, the vehicle rotary electric machine that is driven by an engine has been required to reduce the size and to increase the output power thereof. In order to meet the above requirement, U.S. Pat. No. 5,998,903 or its basic application, JP-A-2000-69729, discloses a vehicle AC generator. In this vehicle AC generator, a stator winding is formed from a plurality of conductor segments, and conductor segments that extend from different layer of different slots are connected, in order to increase the space factor of, or decrease the resistance of, the stator winding.

On the other hand, the engine compartment of a running vehicle, where the vehicle rotary electric machine is mounted, is subjected to foreign particles including electrolyte, such as car shampoo or salt water, and dust. Particularly, because the vehicle AC generator is cooled by a fan, electrolyte or foreign particles may reach the inside of the vehicle AC generator. Thus, it is important to protect the stator core against such environmental hazard.

The vehicle AC generator disclosed in the above publication, the stator winding in which a plurality of conductor segments is welded together at joints of winding. Therefore, temperature of the joints of winding becomes high. For example, if the joints of winding are coated with insulation film, the insulation film may deteriorate due to thermal stress applied while the joints of winding are welded, resulting in peeling off or cracking of the insulation film. Accordingly, electrolyte or other foreign particle may enter the gaps formed due to the peeling or cracking and stay there. If the insulation film coats the gaps, it may be mingled when the joints of winding are welded. Therefore, the joints of winding are not stable, and electrolyte or other foreign particle may enter the gaps formed between insulation films due to peeling or cracking and stay there. In order to improve insulation performance, the joints of winding are coated by additional insulation film. However, if the additional insulation film peels off or cracks due to deterioration caused by thermal stress, the joints of winding are not sufficiently maintained. Moreover, when the joints of winding are welded, the segment ends of the conductor segments melt, brim over in circumferential and radial directions and solidifies again. Therefore, the distance between the joints of winding aligned in a ring becomes so narrow that the joints of winding may be short-circuited.

SUMMARY OF THE INVENTION

The present invention has been made in view of the above problems and has an object of providing a vehicle rotary electric machine that can prevent electrolyte or foreign particles from staying at the joints of winding of the stator winding.

In order to solve the above problems, each of a plurality of conductor segments has segment ends aligned circumferentially to form rings and welded to each other at joints of winding. Further, each the joint of winding has a bare surface. Although temperature of the joint of winding and its vicinities becomes high while welding, foreign particles or electrolyte would not stay because no insulation film, which may be deteriorated by high temperature, exists there. If the joints of winding are subsequently or additionally coated with insulation resin thereafter, it can easily adhere to the joints of winding. Therefore, only a small amount of the insulation resin is necessary. In view of the environmental condition, it is preferable that the insulation film is removed from portions where peeling or cracking is likely, before welding is carried out.

Further, it is preferable that gaps are formed between said joints of winding that are aligned in rings. This reduces the draft resistance of cooling air, thereby improving cooling performance and discharging foreign particles from the pair of frames more efficiently.

Each of the above-described joints of winding is coated with insulation film and forms circumferential undulations. Since there is no deteriorated insulation film on the conductor segments, additional insulation film can readily stick thereto so that a small amount of insulation resin is necessary for the film. As a result, short-circuiting of the joints of winding can be prevented. The undulations increase the surface area and improve cooling effect.

The above described conductor segments are radially aligned in two layers in the slots of the stator core, and the radial length of the joint of winding is shorter than a sum of radial length of the conductor segments. Therefore, distances between radially neighboring joints of winding and between outermost joints of winding and the inner wall of the pair of frames can be made sufficient to prevent short-circuiting.

The bare portion of the joints of winding have flat surfaces at portions in contact with each other. Therefore, stability of the joints of winding can be improved.

The bare portions may have a flat surface on the side of the portions in contact with each other. Therefore, the distance between circumferentially neighboring joints of winding can be ensured so that draft resistance of cooling air can be reduced and that foreign particles can be readily discharged.

In addition, a cross-section of the bare portion is approximately polygonal. Since the surface adjoining the bare portion can be made small, insulation film can easily adhere to portions other than the bare portion, thereby improving environmental condition.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF PREFERRED EMBODIMENTS

A vehicle AC generator according to a preferred embodiment of the invention is described in detail with reference to the appended drawings.

Figure 1:
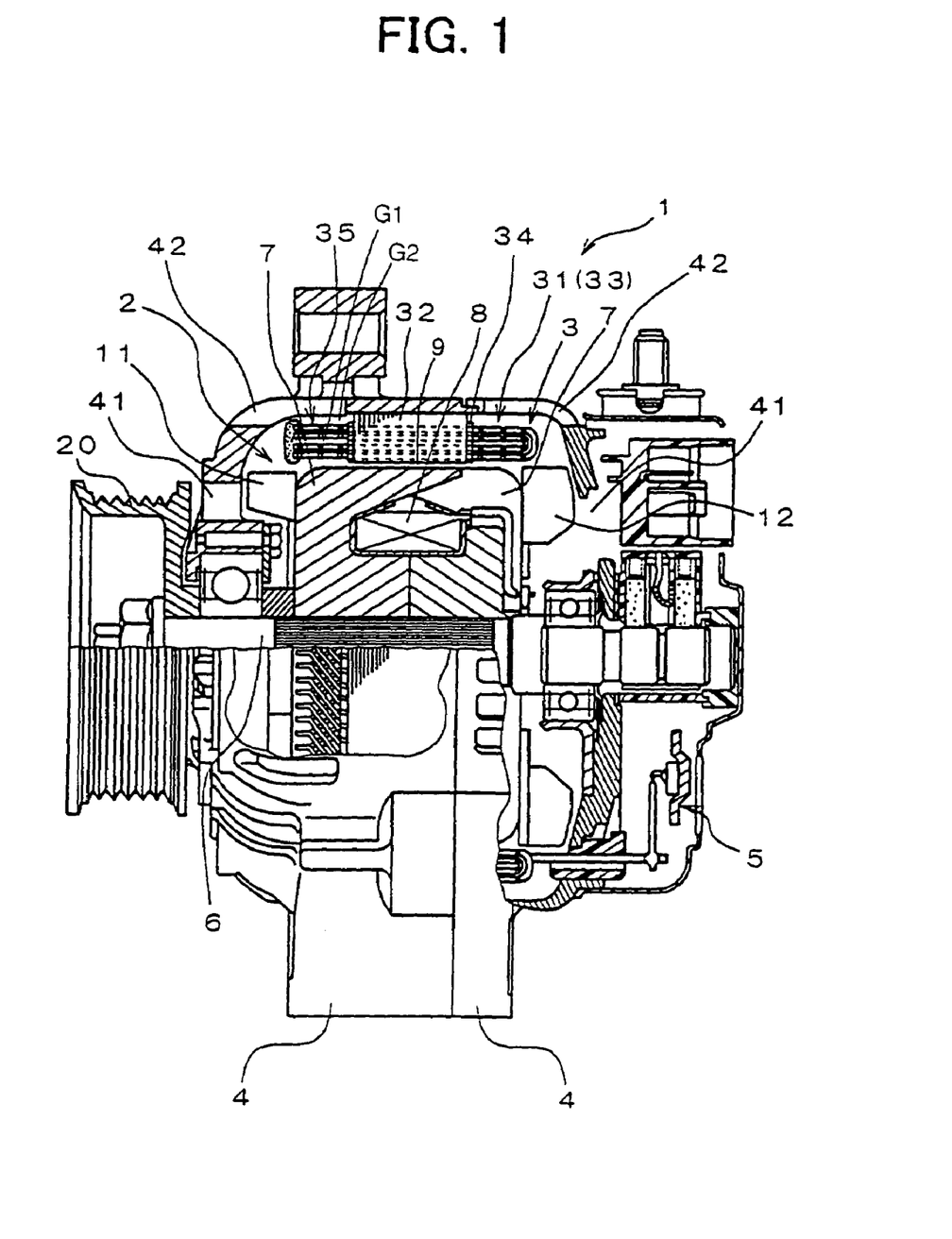
FIG. 1 is a cross-sectional view illustrating the whole structure of a vehicle AC generator according to a preferred embodiment of the invention.

As shown in FIG. 1, the vehicle AC generator 1 according to the preferred embodiment is comprised of a rotor 2, a stator 3, a pair of frames 4, a rectifier unit 5, etc.

The rotor 2 is comprised of a field coil 8 having a cylindrically wound insulation-film-coated copper wire, a pair of pole cores 7, each having six craw poles, and a shaft 6. The shaft 6 penetrates the field coil 8 and the pair of claw poles. The claw poles envelop the field coil 8 from opposite ends thereof. A mixed-flow-type cooling fan 11 is welded to the front end of the pole core 7 to blow air from the front end in the axial and radial directions. A centrifugal cooling fan 12 is also welded to the rear end of the pole core 7 to blow air from the rear end in the radially outer direction.

The stator 3 is comprised of a stator core 32, a stator winding 31 that is formed of a plurality of conductor segments 33 and insulators 34 that insulates the conductor segments 33 from the stator core 32. The stator core 32 is a laminate of thin steel sheets that has a plurality of slots formed at the inner surface thereof. The sheet-like insulators 34 are disposed on the inner wall of the slots. The conductor segments 33 are insulated from the slots by the insulation film coated thereon and insulators 34. Coil ends 35 of the stator winding 31 are formed from the conductor segments 33 projecting from the stator core 32.

The pair of frame 4 accommodates the rotor 2 and the stator 3. The rotor 2 is supported by the pair of frames 4 to rotate about the shaft 6, and the stator is fixed around the pole core 7 at a gap 9. The pair of frames 4 has air discharge windows 42 at portions thereof opposite the coil ends 35 of the stator 3 and air intake windows 41 at axial end portions thereof.

The rotor 2 of the above-described vehicle AC generator 1 rotates in a direction when engine torque is transmitted to the pulley 20 via a belt. If field current is supplied to the field coil 8 of the rotor 2 from outside, the claw poles of the pole core 7 are excited so that the stator winding 31 can generate three-phase AC voltage. Thus, DC power is provided at an output terminal of the rectifier unit 5.

The stator winding 31 is formed from a plurality of U-shaped conductor segments 33 that is arranged and connected at the segment ends thereof in a prescribed rule.

Figure 2:
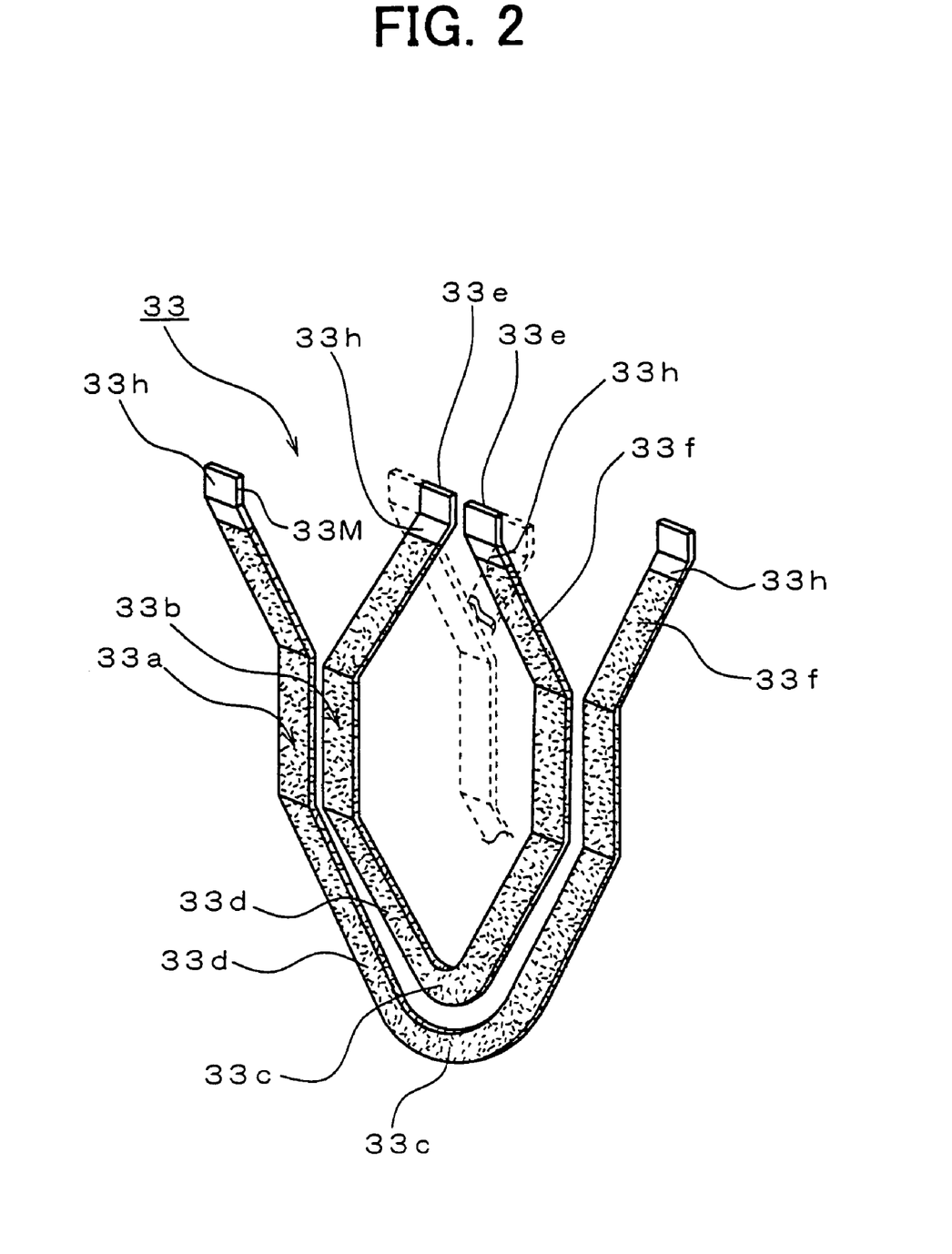
FIG. 2 is a perspective view schematically illustrating a pair of conductor segments of a stator winding of the vehicle AC generator.

As shown in FIG. 2, a pair of the conductor segments 33a and 33b forms a basic unit. A plurality of pairs of the conductor segments 33a and 33b is arranged to form the stator winding 31. Each U-shaped conductor segments 33 has a turn portion 33c and segment ends 33e. The turn portion 33c and adjoining inclined portions 33d form one of the rear (counter pulley side) coil ends 35. The segment ends 33e and the adjoining inclined portion 33f form one of the drive-side (pulley side) coil ends 35.

Figure 3:
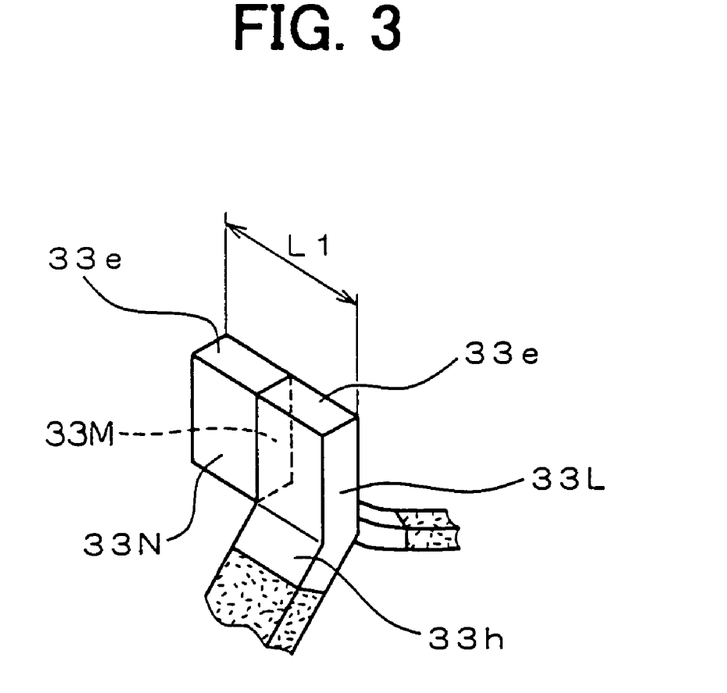
FIG. 3 is a fragmentary perspective view illustrating segment ends of the conductor segments before being welded.
Figure 4:
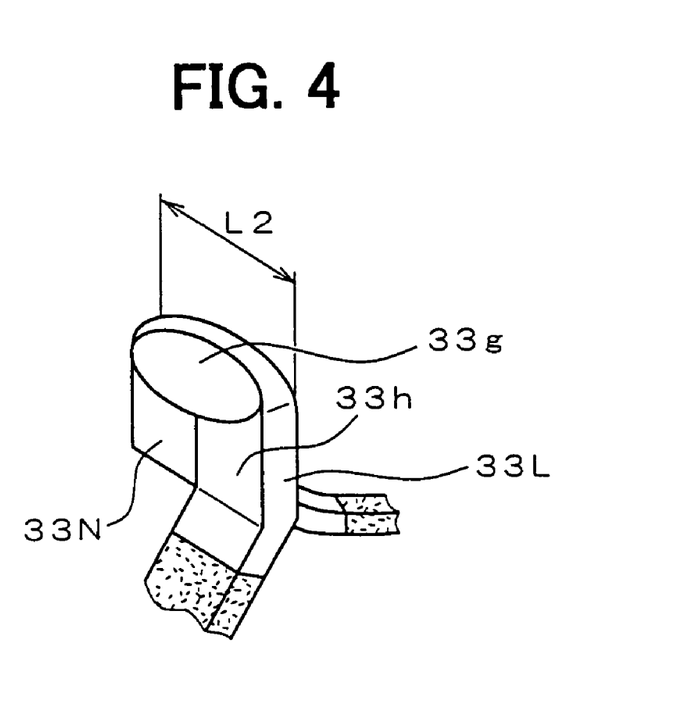
FIG. 4 is a perspective view illustrating segment ends after being welded or a joint of winding of the conductor segments.

The conductor segments 33 are connected at the segment ends 33e thereof by means of TIG (tungsten inert-gas) welding. As shown in FIG. 3, the segment ends 33e of the adjoining conductor segments 33 are brought in contact with each other and a tungsten electrode is put close thereto, thereby melting part of the segment ends, which are solidified again. Thus, as shown in FIG. 4, the raindrop-shape joints of winding 33g are formed. Since each of the joints of winding 33g is melted and formed into such a raindrop-shape, the radial length L2 of the joint of winding 33g after being welded is shorter than the radial length L1 of the two segment ends 33e before being welded as shown in FIG. 3.

Figure 5:
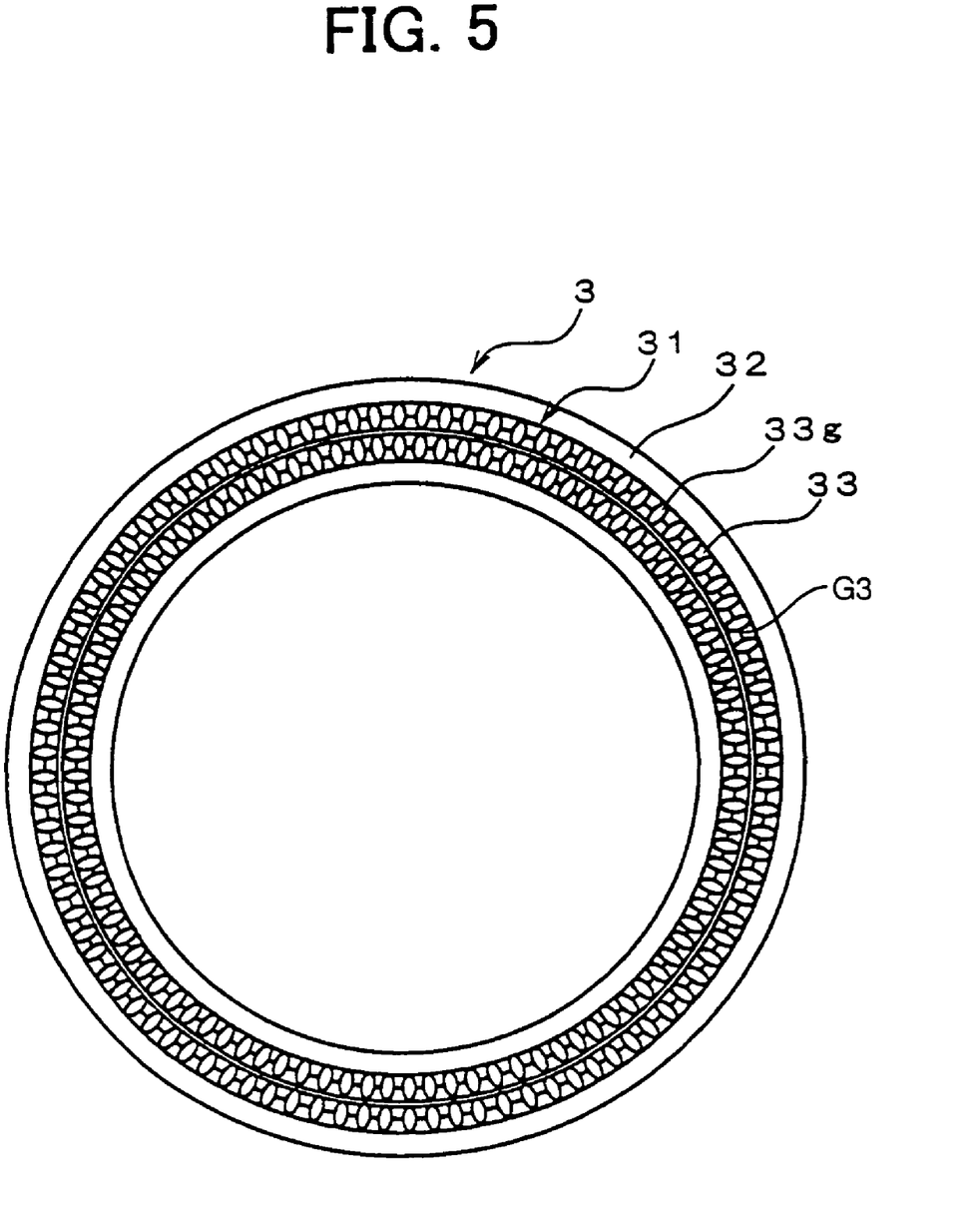
FIG. 5 is a plan view of a stator viewed from above coil ends.
Figure 6:
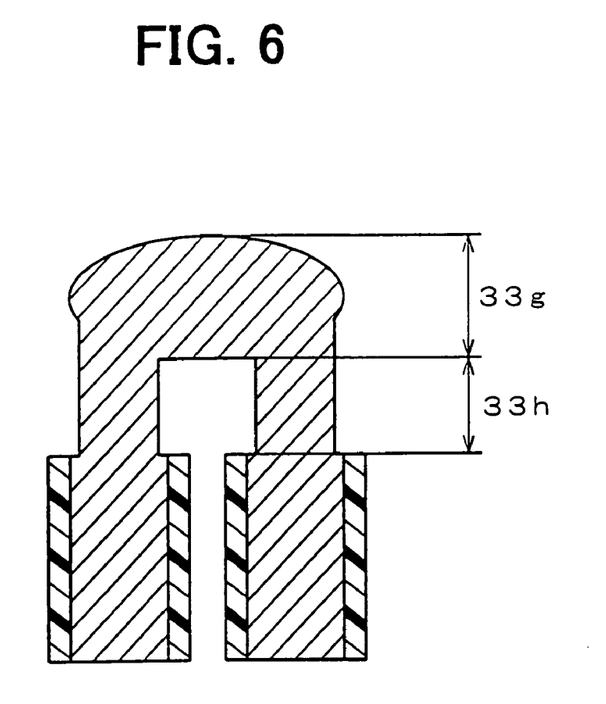
FIG. 6 is a cross-sectional view illustrating a joint of winding of the stator coated with insulation film of the conductor segments.

The stator winding 31, as shown in FIG. 2, has two kinds of conductor segments 33a and 33b as a base unit. Therefore, each base unit has two joints of winding, and the joints of winding 33g are aligned in two coaxial rings, as shown in FIG. 5.

Figure 7:
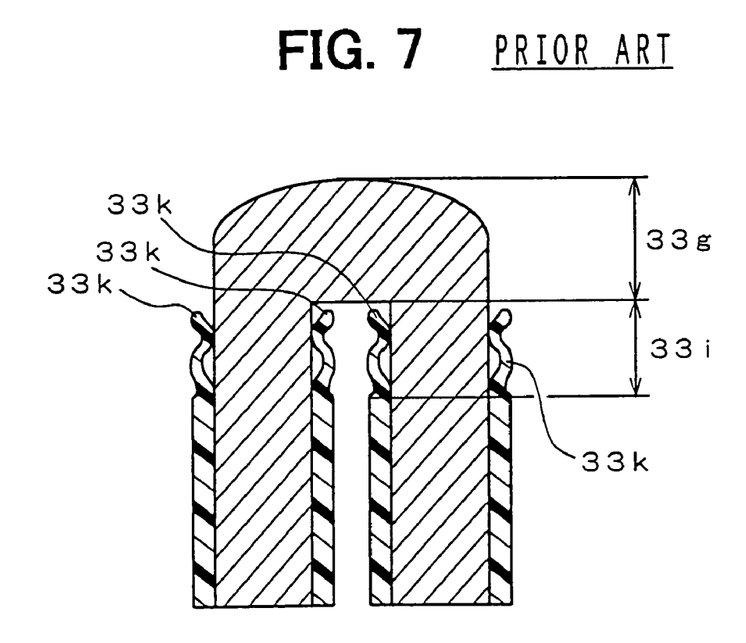
FIG. 7 is a cross-sectional side view illustrating a joint of winding of a stator of a prior art.

The conductor segment 33 has an adjoining bare portion 33h, from which insulating film is removed. This bare portion 33h prevents insulation film, which otherwise deteriorates due to heat while the joint of winding 33g is formed by means of the TIG welding, from peeling off or cracking. As shown in FIG. 7, if insulation film is removed from only a minimum area that is necessary for welding, insulation film 33k in the area 33i that adjoins the joint of winding 33g may deteriorate due to welding heat transmitted thereto and peel off or crack. The area of the bare portion 33h is decided according to temperature of the welding and the dimension of the conductor segments, etc.

Figure 8:
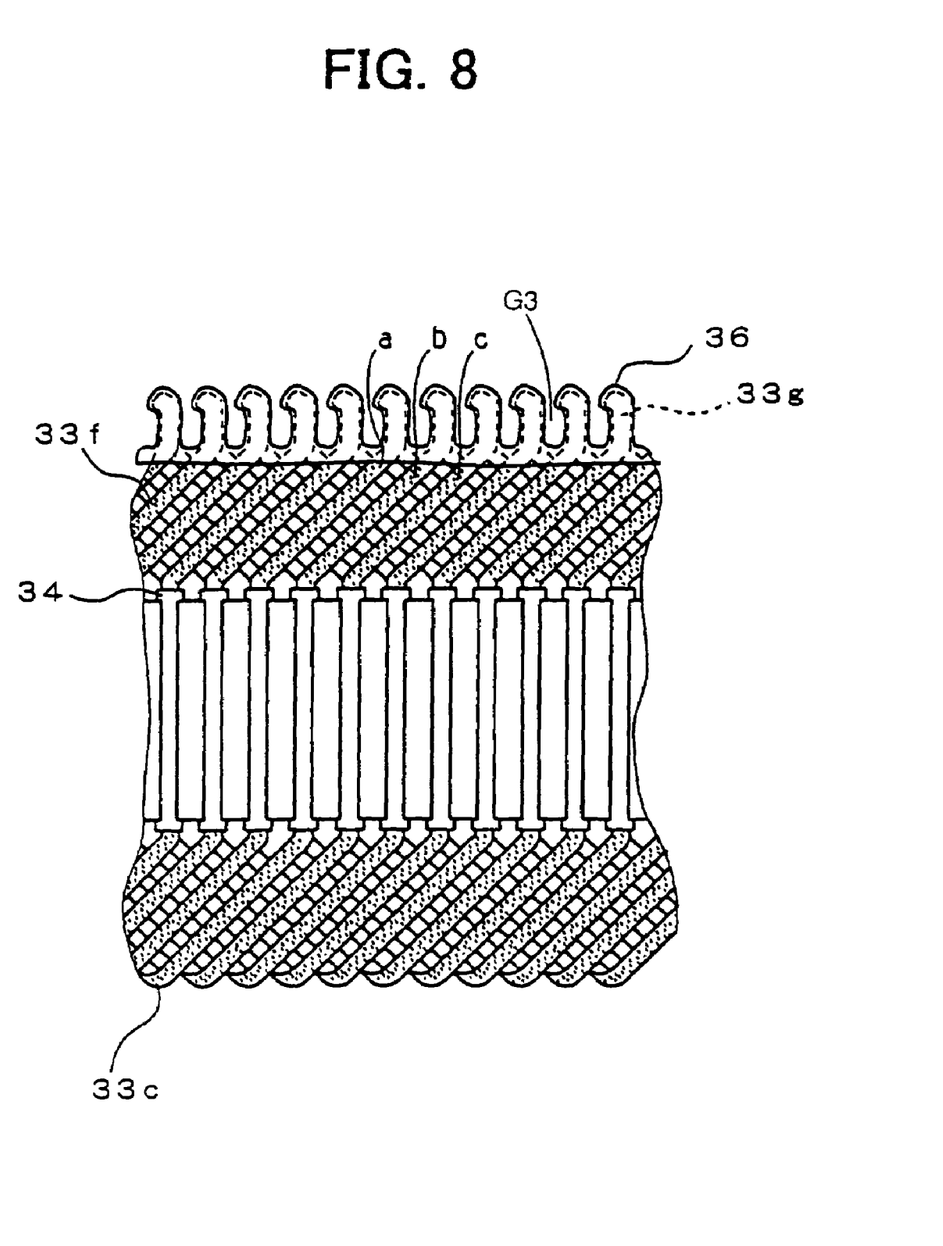
FIG. 8 is a side view of a stator winding of the vehicle AC generator according to the preferred embodiment with the joint of windings coated with insulation film.

If welding temperature is necessary to provide more tight joint of winding 33g of a certain conductor segment a in FIG. 8, the bare portion 33h may be formed at a portion of other conductor segments b and c that cross the certain segment a near the joint of winding 33g thereof.

As shown in FIGS. 2, 3 and 4, contact surfaces 33M of the joint of winding 33g, opposite surface 33L that is opposite to the contact surface 33M and side surface 33N that is on the side of the contact surface 33M of the joint of winding 33g are preferably flat. The flat surface 33M stabilizes the weld condition of the joint of winding. The flat surface 33L provides a gap G1 between the radially adjoining joint of winding 33g and the bare portion 33h or the flat surface 33L provides a gap G2 between the bare portion of the radially outermost joint of winding 33g and the inner wall of the frame 4 as shown in FIG. 1. The flat surface 33N provides a gap G3 between circumferentially neighboring joints of winding 33g as shown in FIG. 5. Thus, the gap G3 prevents short-circuiting and improves the cooling effect and environmental conditions.

As shown in FIG. 8, the joints of winding 33g are formed and covered with insulation resin 36, which have gaps G3 among circumferentially neighboring joints of winding 33g and a top having undulations or concavities-and-convexities.

Thus, because the conductor segments 33 of the stator winding 31 have bare portions 33h, there is no insulation film to deteriorate due to heat on surfaces of the conductor segments that adjoin the joints of winding 33g. Therefore, electrolyte or other foreign particles will not enter or stay in such deteriorated film. If the joints of winding 33g are coated with additional insulation resin 36, the resin 36 can readily stick thereto. Thus, the joints of winding 33g can be coated with a small amount of resin, resulting in low cost and good environmental condition.

As the amount of the resin to be used is reduced, the gaps G3 between the adjoining joints of winding 33g can be widened, so that draft resistance of the cooling air can be reduced. Therefore, cooling effect can be increased and foreign particles can be readily discharged from the inside of the pair of frames 4. Because the radial length of the joint of winding 33g is made shorter than the radial length of the two segment ends 33e, the gaps G1 and G2 between two radially neighboring joints of winding 33g and between the outermost joints of winding 33g and the inner wall of the pair of frames 4 around the joints of winding 33g can be increased to thereby preventing short-circuiting.

Figure 9:
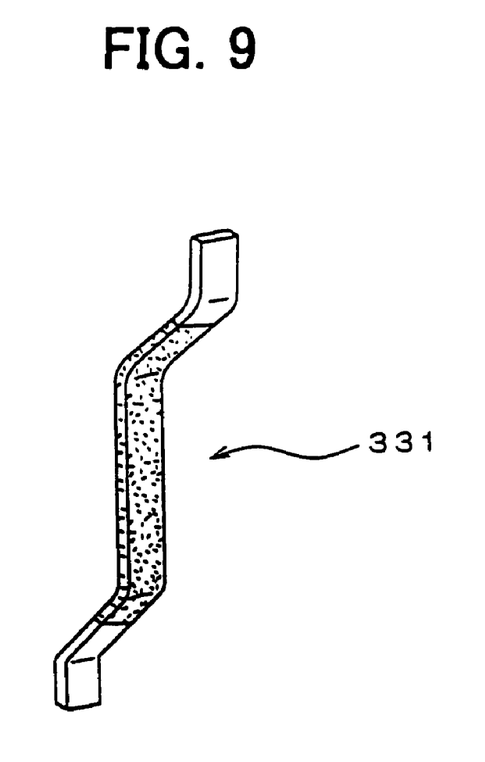
FIG. 9 is a perspective view illustrating a conductor segment according to a variation of the preferred embodiment.

As shown in FIG. 9, the U-shaped conductor segments 33 can be substituted by conductor segments 331 that have no turn portion. The number of the conductor segments and the rings thereof can be changed to meet various requirements.

Figure 10:
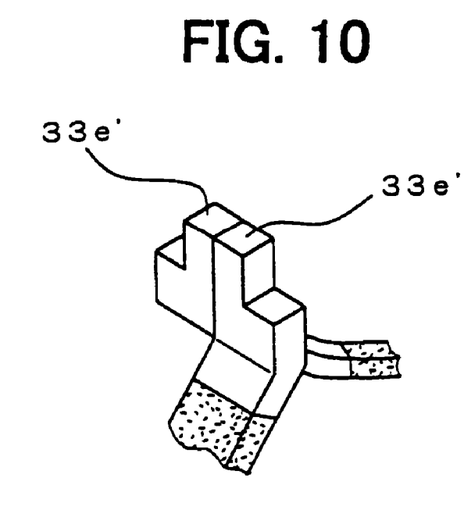
FIG. 10 is a perspective view illustrating segment ends of the conductor segments according to another variation of the preferred embodiment.

As shown in FIG. 10, cut-out portions are formed at portions of two segment ends 33e' opposite the surfaces in contact with each other, so that the radial length can be further reduced. In this case, gaps G1 and G2 between the radially neighboring joints of winding or between the outermost joint of winding and the inner wall of the pair of frames 4 can be widen further. Thus, short-circuiting can be well prevented, cooling effect and environmental condition can be improved further.

The cross-section of the bare portion 33h can be made polygonal instead of rectangular. Since the contact surface of the bare portions can be reduced, it is easier for insulation resin to enter between the bare portions.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A vehicle rotary electric machine including a rotor, a stator having a stator core and a multi-phase stator winding mounted in said stator core and a frame for supporting said rotor and said stator, wherein said multi-phase stator winding includes a plurality of wires coated with insulation film that has adjoining inclined portions extending from said stator core and heat-welded joints of winding disposed in an arc area of said stator core, wherein each of said wires has a bare surface that includes said joints of winding and a portion of said adjoining inclined portions to prevent heat generated while said joints are heat-welded from deteriorating the insulation film, and wherein said stator winding has gaps formed between said joints of winding in said arc area.

2. The vehicle rotary electric machine according to claim 1, wherein each of said joints of winding is coated with insulation resin.

3. A vehicle rotary electric machine including a rotor, a stator having a stator core and a multi-phase stator winding mounted in said stator core and a frame for supporting said rotor and said stator, wherein said multi-phase stator winding includes a plurality of wires coated with insulation film that has adjoining inclined portions extending from said stator core and heat-welded joints of winding disposed in an arc area of said stator core, wherein each of said wires has a bare surface that includes said joints of winding and a portion of said adjoining inclined portions to prevent heat generated while said joints are heat-welded from deteriorating the insulation film, and wherein said wires are radially aligned to form a plurality of layers in respective slots, and wherein a radial length of said joints of winding that are welded is shorter than a sum of a radial length of said joints of winding prior to being welded.

4. The vehicle rotary electric machine according to claim 1, wherein said bare surface has a flat surface at a portion in contact with each other.

5. The vehicle rotary electric machine according to claim 4, wherein said bare surface has flat surfaces opposite said portion in contact with each other.

6. The vehicle rotary electric machine according to claim 4, wherein said bare surface has a flat surface on the side of said portion in contact with each other.

7. The vehicle rotary electric machine according to claim 1, wherein said bare surface has an approximately polygonal cross-section.

8. The vehicle rotary electric machine according to claim 3, wherein each of said joints of winding is coated with insulation resin.

9. The vehicle rotary electric machine according to claim 3, wherein said bare surface has a flat surface at a portion in contact with each other.

10. The vehicle rotary electric machine according to claim 3, wherein said bare surface has an approximately polygonal cross-section.

* * * * *